Aug. 29, 1944.   J. PIGNONE   2,356,880
REFLEX CAMERA
Filed Aug. 21, 1940   5 Sheets-Sheet 3
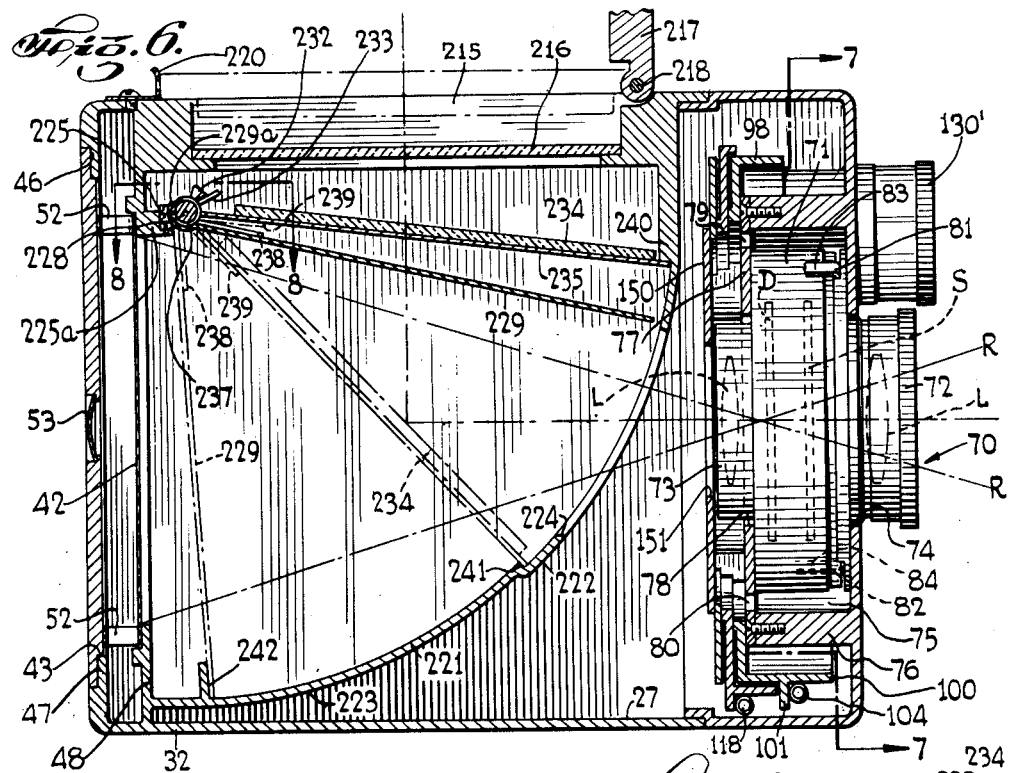
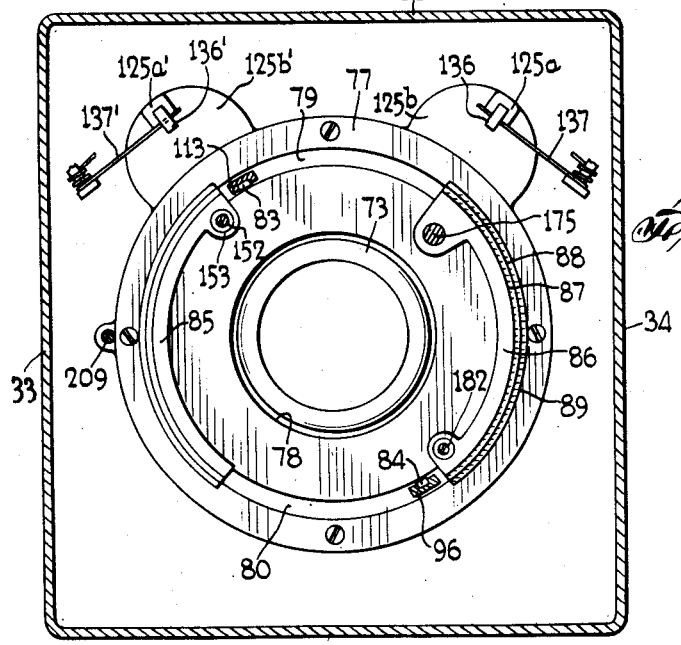
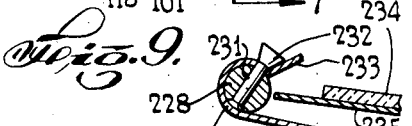
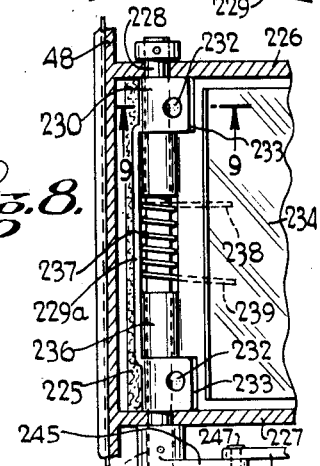
INVENTOR
JOSEPH PIGNONE
BY
ATTORNEY

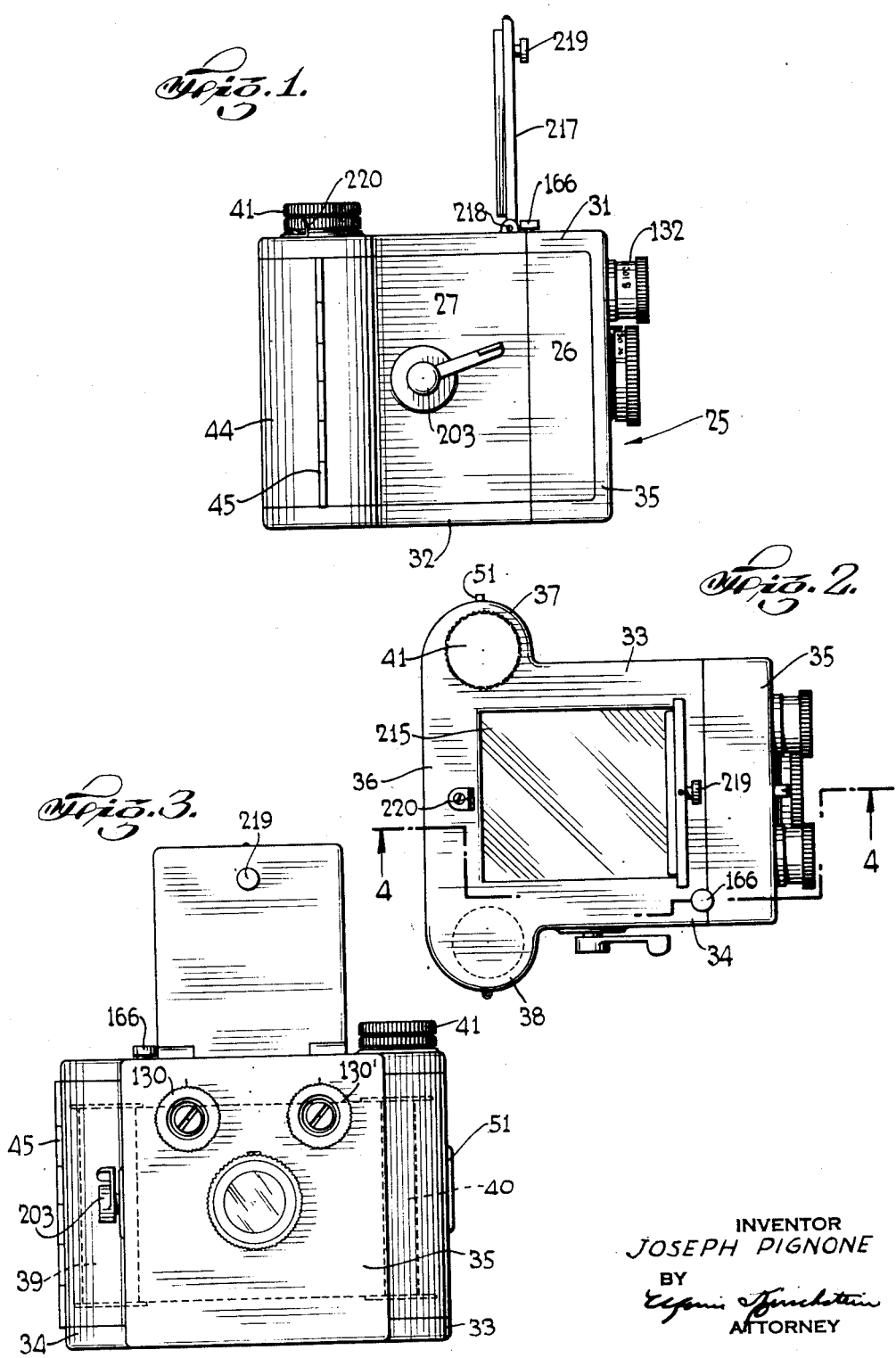

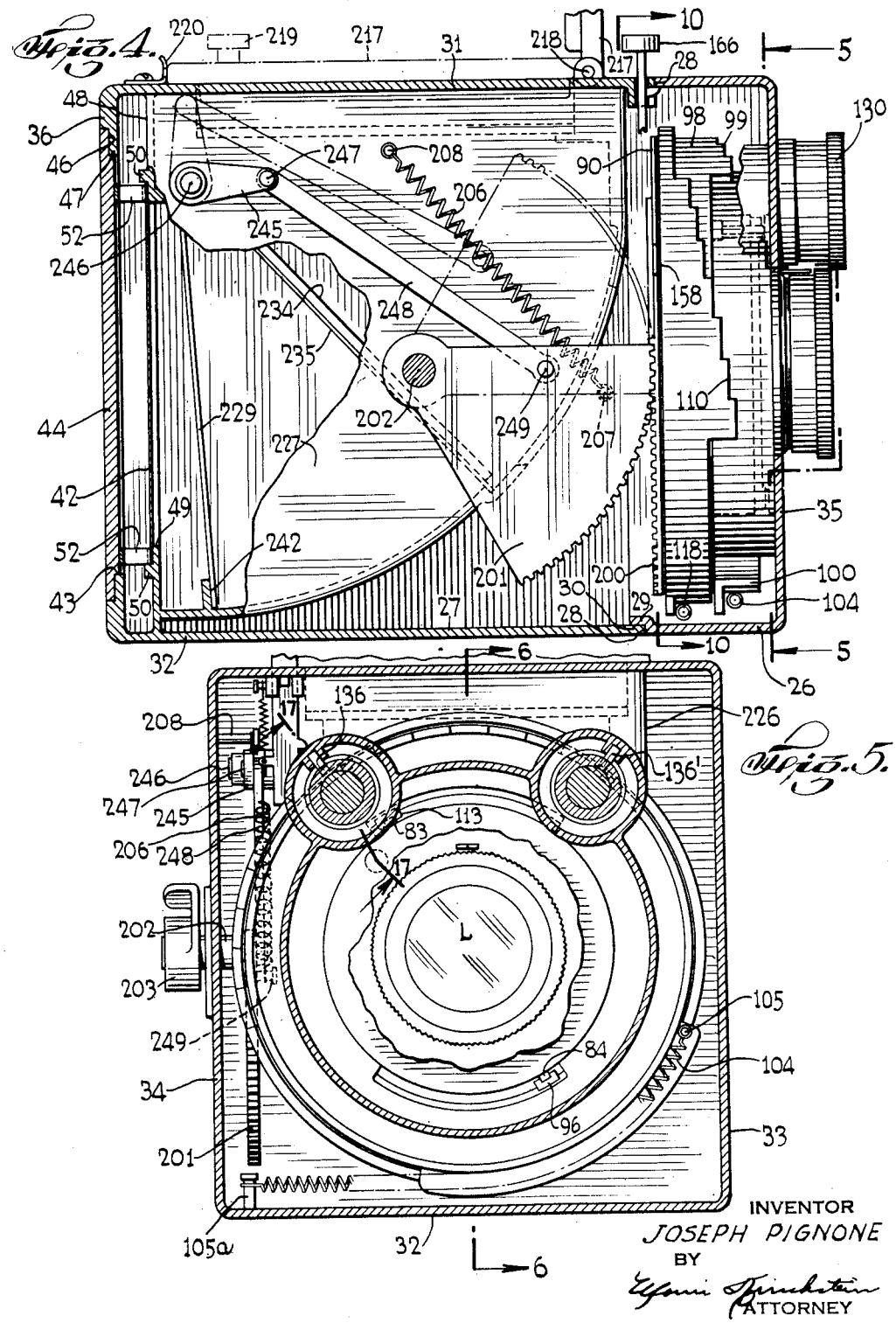

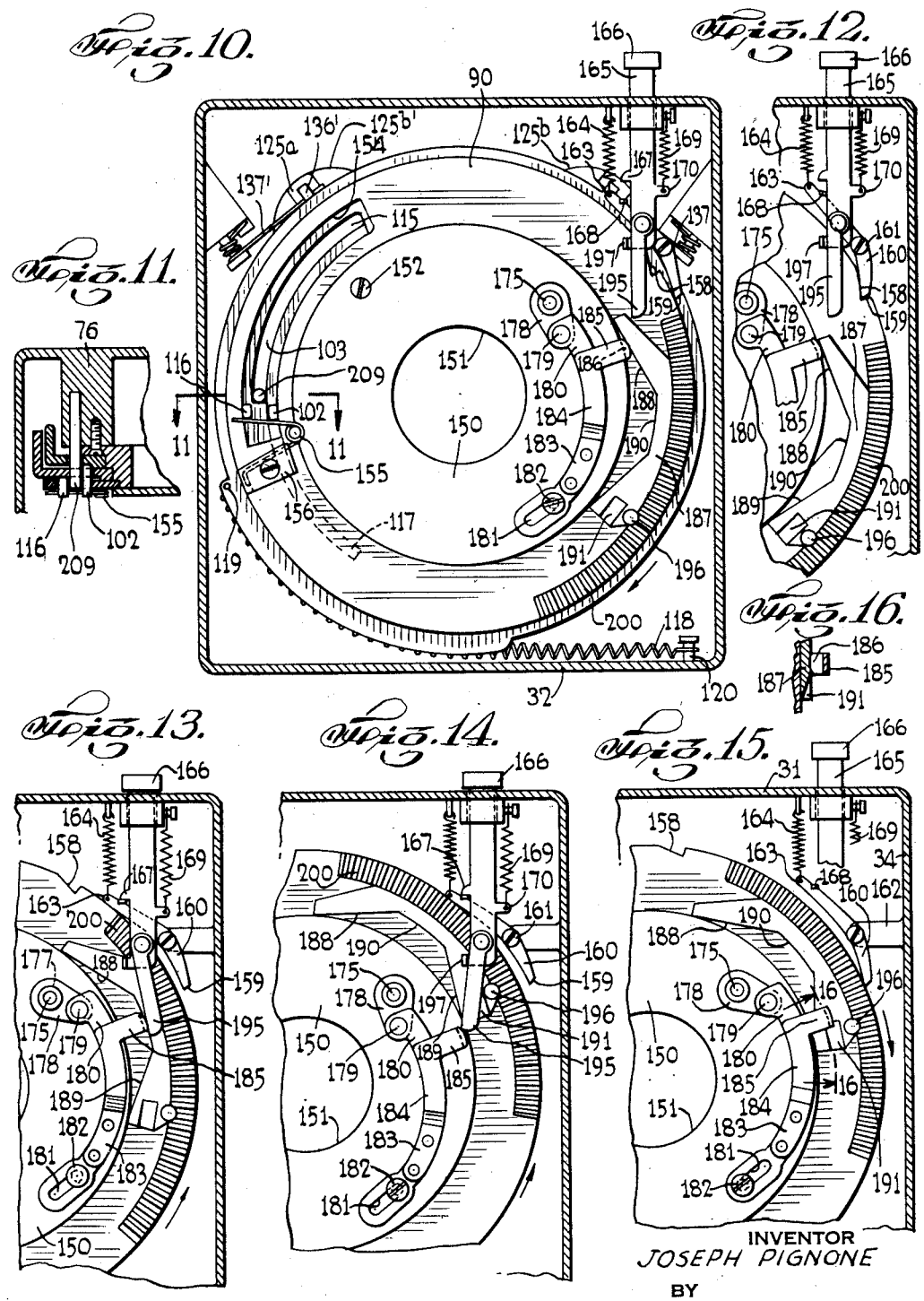

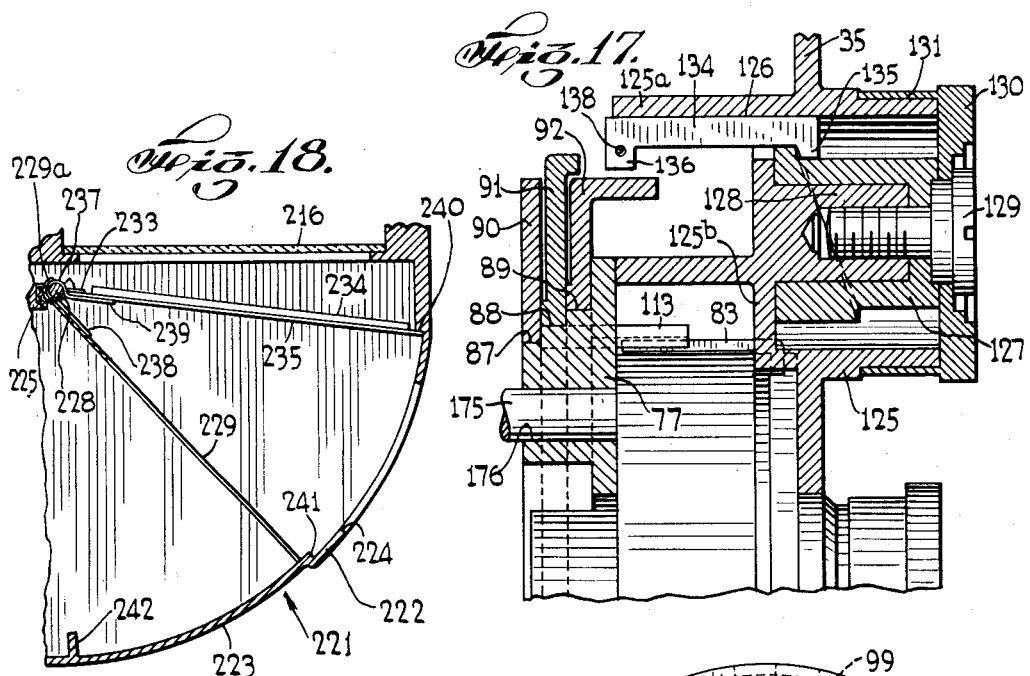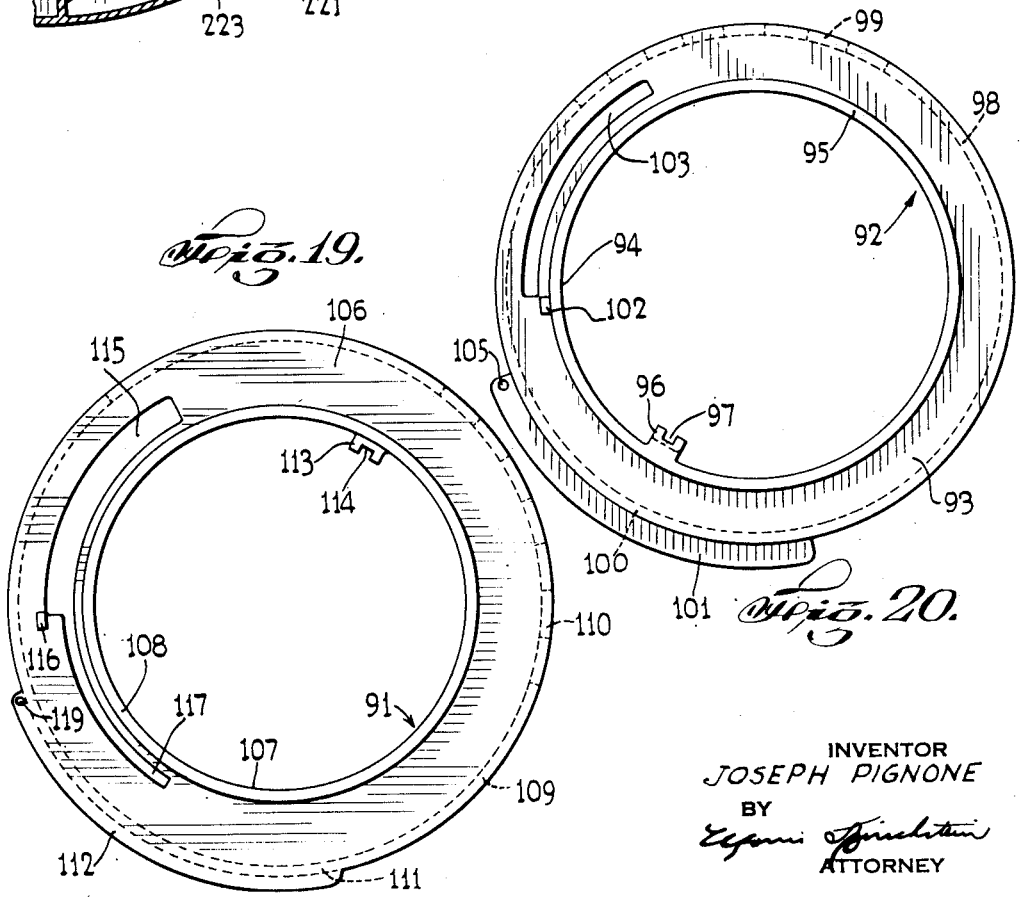

Patented Aug. 29, 1944

2,356,880

UNITED STATES PATENT OFFICE 2,356,880

REFLEX CAMERA

Joseph Pignone, Brooklyn, N. Y., assignor to Universal Camera Corporation, New York, N. Y., a corporation of Delaware Application August 21, 1940, Serial No. 353,483

21 Claims. (Cl. 95—42)

This invention relates to reflex cameras. It is particularly directed to reflex cameras wherein the viewing optical system employs the objective lens of the photographic optical system and wherein a movable reflex mirror is used to reflect the object to be photographed upon a viewing screen.

It is customary when using a reflex camera of the character described to set the diaphragm associated with the objective lens at maximum aperture in order to most conveniently view and focus the object on the ground glass viewing screen. It is also common practice, in order to obtain a good depth of field or fine detail when employing a high speed film emulsion or relatively slow shutter speeds, to stop down the diaphragm aperture employed in photographing a scene.

Accordingly, with the ordinary reflex camera of the type aforementioned, it is necessary to set the diaphragm at its maximum aperture while viewing and focusing and to then manually reduce the diaphragm setting to the proper opening which the operator considers most desirable for photographing a specific object. This presents a considerable disadvantage, in that additional time for handling is thus involved in stopping down the aperture after a scene has been satisfactorily framed and focused. While this may be avoided in some cases by initially setting the diaphragm to the smaller aperture, the difficulty is then presented that an insufficient amount of light is transmitted at small apertures.

Accordingly, one of the objects of this invention is to provide a highly practical and efficient reflex camera of the character described wherein the diaphragm is automatically opened to its maximum aperture during viewing, and wherein the diaphragm is automatically stopped down to a pre-selected aperture opening after a release button has been operated but before an exposure has been made.

A further object of this invention is to provide a reflex camera of the character described having novel means for automatically pre-selecting the shutter speed.

Another object of this invention is to provide a reflex camera having a shutter associated with the objective lens and disposed in front of the reflex mirror.

Still a further object of this invention is to provide, in a reflex camera of the character described, novel driving means for actuating the mechanisms employed to pre-select the shutter speed and the diaphragm aperture.

A further object of this invention is to provide a reflex camera of the character described wherein the shutter is automatically opened during viewing and wherein by operation of the release button the shutter is automatically closed between viewing and exposure and then reopened for a pre-selected exposure period.

Still another object of this invention is to provide, in a reflex camera having means for automatically pre-setting the shutter speed, a less cumbersome and intricate and more exact shutter mechanism than the presently employed focal plane spring roller shutter.

An additional object of this invention is to provide a reflex camera of the character described having novel means for masking the ground glass viewing screen while the reflex mirror is in motion, to prevent light from entering the objective field through the viewing screen.

A further object of my invention is to provide a reflex camera of the character described which shall be economical to manufacture, rugged in construction and extremely simple to operate.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

In the accompanying drawings, in which is shown one of the various possible embodiments of this invention, Fig. 1 is a side elevational view of a reflex camera embodying my invention;

Fig. 2 is a top plan view thereof;

Fig. 3 is a front elevational view thereof;

Fig. 4 is an enlarged sectional view taken substantially along the line 4—4 of Fig. 2, showing cocked positions of various elements thereof and indicating in dot and dash lines the uncocked position of the reflex mirror driving linkage;

Fig. 5 is a sectional view taken substantially along the line 5—5 of Fig. 4;

Fig. 6 is a sectional view taken substantially along the line 6—6 of Fig. 5 but with the reflexing mirror in uncocked position and showing cocked positions of various elements thereof in dot and dash lines;

Fig. 7 is a sectional view taken substantially along the line 7—7 of Fig. 6 with the driving mechanisms removed;

Fig. 8 is a sectional view taken substantially along the line 8—8 of Fig. 6;

Fig. 9 is a sectional view taken substantially along the line 9—9 of Fig. 8;

Fig. 10 is a sectional view taken substantially along the line 10—10 of Fig. 4 and showing various elements of the driving and timing mechanisms as they approach cocked position;

Fig. 11 is a sectional view taken substantially along the line 11—11 of Fig. 10;

Figs. 12, 13, 14 and 15 are detail views of the driving, timing and release mechanisms in various positions during their operating cycles and showing respectively cocked position, position intermediate release and exposure, exposure position, and an early position during cocking;

Fig. 16 is a sectional view taken substantially along the line 16—16 of Fig. 15;

Fig. 17 is a sectional view taken substantially along the line 17—17 of Fig. 5;

Fig. 18 is a side elevational view of the reflexing mirror assembly, showing the position thereof intermediate the release and exposure;

Fig. 19 is a rear view of the shutter speed setting ring; and

Fig. 20 is a rear view of the diaphragm aperture setting ring.

In the following description, the direction of rotation of any member, unless otherwise stated, is with reference to an observer at the front of the camera.

*The casing and film handling mechanism*

In the accompanying drawings and more particularly Figs. 1 through 7, I have shown a reflex camera 25 comprising a hollow box-like casing of a molded plastic material, such as for example a phenol condensate, which for ease of assembly may consist of front and rear sections 26 and 27. A shoulder 28 and inset flange 29 on the front section 26 frictionally engages the edge 30 of the rear section 27, to hold the sections in assembled relation and provide a light seal. The casing as thus formed comprises top and bottom walls 31 and 32, side walls 33 and 34, and front and rear walls 35 and 36.

The rear portion of the camera may be bulged as at 37 and 38 (Fig. 2) to provide film chambers for the usual feed and take-up spools 39 and 40. A film spool winding knob 41 for actuating the film take-up spool 40 through any suitable train of mechanism is rotatably mounted on the top wall 31 of the casing. To provide access at the rear of the casing for inserting the feed roll 39 and threading the film 42 in its work path, an aperture 43 is provided in the rear wall 36 of the casing, large enough to pass the film spool with which the camera is designed to be used.

The aperture 43 is closed by means of a door 44 operating on a hinge 45 on the bulged portion of the side wall 34. Marginal grooves 46, recessed along the top, bottom and side edges of the swinging door 44, cooperate with mating flanges 47 which define the inner edges of the aperture 43 to provide a light seal at this juncture.

Parallel to and spaced a short distance forward of the rear wall 36 is a film supporting wall 48, having an aperture 49 which is in optical alignment with the photographical optical system of the camera and of the same dimensions as the negative. A pair of parallel ledges 50, formed on the rear surface of the plate 48 and disposed above and below the aperture 49, provide a film path for guiding the film over the aperture 49 and between the feed and take-up spools 39 and 40.

Cooperating parts of a suitable catch member 51 are attached to the free end of the swinging door 44, and the bulged out portion of the side wall 33, to releasably hold the swinging door in closed position.

The swinging door 44 may also carry means, such as the spring-supported pressure pad 52, shown in Fig. 4, to hold the film 42 against the plate 48.

A film viewing aperture 53 (Fig. 6), covered by a transparent red plate opaque to actinic rays, is suitably disposed in the swinging door 44.

*The shutter speed and diaphragm aperture preselecting mechanisms*

The reflex camera 25 is provided with a combined shutter, lens and diaphragm assembly indicated at 70 in Fig. 6. The said assembly may be of any type well known to the art, such as for example one having an objective lens comprising a pair of spaced lenses L, L between which are disposed an iris type shutter S and an iris type diaphragm D. By associating the shutter with the objective lens, bulky focal plane shutters which must sweep over an aperture at least as large as the aperture 49 in the plate 48, are eliminated and in their stead simpler, more compact and more exact shutters, such as for example the iris type, may be employed.

The casing for said assembly 70 has a central portion 71 of relatively large diameter housing the shutter S and diaphragm D, and end portions 72 and 73 of smaller diameter housing the lenses L, L. The forward lens housing 72 is received in an aperture 74 in the front wall 35 of the camera casing. The central casing portion 71 is disposed within a chamber 75 carried on the rear face of the front wall 35. This chamber 75 comprises a circular side wall 76 closed at its rear end by a disc 77 having a centrally disposed aperture 78 in optical alignment with the aperture 74 and adapted to freely receive the rear lens housing 73. The disc may also be provided with a pair of arcuate slots 79 and 80 for the purpose hereinafter described. The central housing 71 is firmly held between the front wall 35 of the camera casing and the disc 77 is prevented from sidewise movement by frictional engagement between the forward lens housing 72 and aperture 74.

In accordance with my invention, I provide means for pre-selecting the shutter speed and diaphragm aperture determined by the operator of the camera to be most desirable for the taking of any given scene. Such means may comprise a pair of diametrically opposed lever arms 81 and 82, whose respective positions relative to the housing 71 regulate the shutter speed and diaphragm aperture of the enclosed shutter S and diaphragm D, in any manner well known to the art. Said lever arms 81 and 82 project from the shutter and diaphragm housing 71 and are provided with rearward extensions 83 and 84 respectively.

Integrally formed on the rear face of the disc 77 are a pair of diametrically opposed arcuate ledges 85 and 86 (Fig. 7) disposed between the slots 79 and 80. The outer surfaces of said ledges are provided with a plurality of concentric arcuate steps 87, 88 and 89, as clearly shown in Figs. 7 and 17. Journalled on these steps are three rings 90, 91 and 92, which serve respectively as the driving ring, the shutter speed setting ring and the diaphragm aperture setting ring.

The diaphragm aperture setting ring 92 comprises a disc portion 93 (Fig. 20) having a central aperture 94 which is snugly fitted on the lower step 89. The front face of the disc 93 abuts the rear surface of the plate 77 and the rear face of the disc is provided with an annular stub flange 95 adjacent the aperture 94 which abuts the front surface of the shutter speed setting ring 91. Projecting inwardly of aperture 94 is an L-shaped arm 96 which passes freely through the arcuate slot 80 and is provided with a groove 97 which engages the extension 84 on the diaphragm setting lever arm 82. The disc 93 is also provided with a forwardly extending marginal ledge 98 which has a stepped cam surface 99 (Figs. 4 and 20) whose several steps are spaced from each other an angular distance equal to the angle of travel of the diaphragm aperture setting lever arm 82 between the several diaphragm aperture openings. A portion 100 of the marginal ledge 98 which is of greater height than the remainder of said ledge is provided with an outwardly extending sector flange 101. A pin 102 is mounted on the rear surface of the disc 93. An arcuate limiting stop slot 103 concentric with the aperture 94 is also provided on the disc 93.

To constantly urge the diaphragm aperture setting ring 92 in a clockwise direction towards the position of minimum aperture opening, I provide a long helical spring 104 which bears on the raised ledge portion 100 and is prevented from shifting by the flange 101. Said spring 104 is tensioned between a pin 105 on the flange 101 and a pin 105a mounted on the bottom wall 32 of the camera casing.

The shutter speed setting ring 91, which is disposed at the rear of the diaphragm aperture setting ring 92, is generally similar in shape to the said diaphragm aperture setting ring and comprises a flat disc 106 having a central aperture 107 and a rearwardly projecting stub ledge 108 which is disposed around said aperture and abuts the front surface of the drive ring 90. The marginal ledge 109 provided on the forward surface of the disc 106 is adapted to be received over the diaphragm aperture setting disc 92 and is provided with a stepped cam surface 110 and portion 111 of greater height than the remainder of said ledge 109. The several steps of the cammed surface 110 are spaced from each other an angular distance equal to the angle of travel of the shutter speed setting lever arm 81 between the several shutter speeds. The disc 106 is provided with a sector flange 112 adjacent the raised ledge portion 111. Projecting inwardly of the aperture 107 is an L-shaped arm 113 which passes freely through the arcuate slot 79 and is provided with a groove 114 which grips the extension 83 on the shutter speed setting lever arm 81. An arcuate limiting stop slot 115 and a rearwardly extending pin 116 are also formed on the disc 106. In order to enable the pin 102 of the diaphragm aperture setting ring 92 to extend freely to the rear of the disc 106, I provide another arcuate slot 117 on the disc 106 which may comprise in part, as shown in Fig. 19, a widening of the limiting stop slot 115.

To constantly urge the shutter speed setting ring 91 in a clockwise direction towards the position of fastest speed, I provide a long helical spring 118 which bears on the raised marginal portion 111 of the disc 106 and is prevented from shifting by the sector flange 112. Said spring is tensioned similarly to the spring 104 between a pin 119 on the sector flange 112 and a stationary pin 102 on the bottom wall 32 of the camera casing.

I provide the following mechanism to cooperate with the stepped cam surface 110 of the ring 91 and stop the said ring at a pre-selected shutter speed: A cylindrical casing 125 is formed on the front wall 35 of the camera casing (Fig. 17) with portions thereof projecting forwardly and rearwardly of said front wall. Integral with the rear of the casing 125 is an arm 125a having a keyway 126. A barrel cam 127 is disposed within the casing 125 and is journalled on a circular projection 128 formed on the rear wall 125b of the casing 125. The cam 127 is rotatably held by a screw 129 which threadedly engages the projection 128. A hand operable fluted knob 130 having an integral sleeve 131 provided with indicating numerals 132 (see Fig. 1) is adapted to rotate with said cam 127, being held in positive engagement therewith in any suitable manner, as by a plurality of mating radial grooves and projections (not shown) on abutting surfaces of the knob 130 and cam 127. A key 134 is received in said keyway 126 and is provided at its forward end with a cam following arm 135 which rides on the barrel cam 127. The rear end of the key 134 has a stop finger 136 which lies in the path of the cammed surface 110 of the shutter ring 91.

Suitable means is provided to cause the key 134 to follow the cam 127 as the latter is rotated by the knob 130. Said means may comprise a coil spring 137 (see Figs. 7 and 10) which has a free end slidably received in a hole 138 in the finger stop 136 and constantly urges the key 134 rearwardly.

When the knob 130 is rotated, the barrel cam 127 will cause the key 134 to move either rearwardly or forwardly and assume a given position with respect to the plane of the disc 106. It is thus seen that when the shutter ring 91 is rotated in a counter-clockwise direction to its extreme position, it will carry the shutter speed lever arm 81 to a "bulb" shutter setting. When the direction of rotation of the ring 91 is then reversed and the spring 118 allowed to turn the ring in a clockwise direction, it will continue to rotate until one of the shoulders of the stepped cam 99 strikes the stop fingers 136 on the key 134, thus stopping rotation and setting the shutter at a speed corresponding to that indicated by the selected numeral 132.

Means similar to the above described shutter speed pre-selecting means is also provided to pre-select the diaphragm aperture opening, the various parts thereof being denoted in the drawings by primed numerals similar to those employed in the description of the shutter speed pre-selecting means. It will be seen, however, by reference to Fig. 5, that the stop finger 136' which cooperates with the cammed surface 99 on diaphragm ring 92 to stop it at a pre-selected diaphragm aperture opening, is slightly longer than the corresponding stop finger 136 associated with the shutter ring 91, since the cammed surface 110 of the shutter ring has a smaller radius than the cammed surface 99 of the diaphragm ring.

*The driving, timing and release mechanisms*

Abutting the rear surface of the drive ring 90 to hold the drive ring 90, the shutter ring 91 and the diaphragm ring 92 in assembled contacting relationship is a plate 150 (Fig. 6) having a central aperture 151 in optical alignment with the photographic optical system of the camera and of sufficient diameter to allow the cone of light rays R—R to pass unobstructed therethrough. The plate 150 is suitably held in position, as by a screw 152 (Fig. 10) which threadedly engages an ear 153 (Fig. 7) projecting interiorly of one of the stepped ledges 85.

The pins 116 and 102 which project rearwardly of the shutter and diaphragm rings 91 and 92 are slidably received in an arcuate slot 154 formed in the drive ring 90. The slot 154 is bridged adjacent one end thereof by the free leg of an over-drive hairpin spring 155, which is adapted to resiliently urge the pins 102 and 116 in a counter-clockwise direction when the drive ring is cocked. The other leg of the spring 155 is captively held in any suitable manner as by a grooved plate 156 disposed on the rear face of the drive ring 90.

In order to hold the drive ring 90 in cocked position during viewing and until the release button 166 is actuated, the periphery of the drive ring 90 is notched to provide a ratch 158. The ratch 158 cooperates with a detent 159 formed on one end of a lever 160 which is pivotally mounted, as at 161, on a post 162 provided for this purpose on a side wall 34 of the camera casing. The other end 163 of the lever 160 is urged in a counter-clockwise direction by a spring 164 maintained under tension between this end and the top wall 31 of the camera casing.

Means is provided to release the driving ring from cocked position by unlatching the detent 159 from the ratch 158. Such means comprises a release shaft 165 slidably held in the top wall 31 of the camera casing and provided at its upper end with a finger release button 166. A lateral projection 167 on one side of the release shaft 165 is provided to engage a mating projection 168 on the lever 160 adjacent the spring 164, so that when the finger release 165 is pressed to its extreme downward position, shown in Figs. 13 and 14, the lever 160 will be rotated in a clockwise direction to raise the detent 159 from the ratch 158 and release the drive ring 90. A spring 169 is tensioned between the top wall 31 of the camera casing and an arm 170 on the release shaft 165 to normally maintain the release shaft in its upper position shown in Figs. 10, 12 and 15.

When employing a shutter associated with the objective lens of the camera, it is necessary to first have the shutter open during viewing, then closed when the reflexing mirror is moved from a viewing to a photographing position, and finally opened for a pre-selected period of exposure. The mechanism provided for this cycle of operations comprises a shutter actuating shaft 175 which projects rearwardly from the shutter-diaphragm-lens assembly 70 through an aperture 176 (Fig. 17) in the plate 77 and an aperture 177 in the plate 150. Said shaft 175 has two extreme positions which may be called the "operative position," shown in Fig. 12, wherein the shutter is actuated at a set speed, and the "unoperated position," shown in Fig. 15, to which spring means (not shown) associated with the shutter tends to return the shaft. The shutter actuating shaft 175 is provided at its rear end with a crank arm 178 which pivotally engages, as at 179, one end of a rigid arcuate link 180. A slot 181 is provided in the other end of the link 180 for slidable and rotative engagement with a pin 182 mounted on the plate 77 and extending through the plate 150. Fixedly mounted on the rigid link 180 is a spring link 183 having a portion 184 spaced a slight distance away from the said rigid link. Extending outwardly from the portion 184, I provide a spring arm 185 which has a forwardly extending finger 186 (Fig. 16). Cooperating with the spring arm 185 and finger 186 is a cam 187 permanently attached to the drive ring 90. This cam is of a special shape and is adapted to actuate the shutter shaft 175 through the sequence of operations above described.

The end portions of the cam 187 are tapered to form outwardly sloping cam surfaces 188 and 189. Between said surfaces is an idling cam surface 190 concentric with the central aperture of the drive ring 90. An inclined return groove 191 is provided at the rear end of the cam which is in alignment with the spring finger 186 when the shutter actuating shaft 175 is in unoperated position.

Means is also provided to maintain the shutter actuating shaft 175 in operative position as long as the finger button 166 is depressed when an operator has pre-selected a "bulb" exposure. Such means comprises a pendant arm 195 pivotally mounted on the lower extremity of the release shaft 165 and a pin 196 on the cam 187 adjacent the groove 191. When the cam driving ring 90 rotates in a clockwise direction, after the release shaft 165 has been depressed, the arm 195 will be engaged by the spring finger 186 while it is sliding on the idling cam surface 190 and will rotate said arm 195 in a clockwise direction to the position shown in Fig. 13. As the ring 90 continues to rotate and approaches exposure position, the spring finger 186 will be depressed by the cam surface 189 and open the shutter on the downward "bulb" stroke. At the same time, the pin 196 will contact the arm 195 and rotate it in a counter-clockwise direction against an abutment 197 on the release shaft 165, as shown in Fig. 14. In this position, the arm 195 is locked and forms a rigid extension of the release shaft 165 which prevents the spring finger 186 from moving outwardly after it has cleared the cam surface 189, and thus maintains the shutter actuating shaft 175 in its operative position with the shutter open. When finger pressure is removed from the release button 166, the release shaft 165 will spring upwardly, carrying with it the arm 195. This action permits the spring finger 186 to move outwardly and allows the shutter actuating shaft 175 to return to unoperated position.

In order to rotate the drive ring 90 in a counterclockwise direction to cock the shutter and diaphragm rings 91 and 92, I mount a quadrantal gear rack 200 (Figs. 4 and 10) which meshes with a gear sector 201 carried on a shaft 202. Said shaft 202 is journalled in the side wall 34 of the camera casing and is provided on a portion extending through the camera casing with a cocking lever 203. A spring 206 which actuates the drive ring 90 and timing mechanism on the exposure stroke is tensioned between a pin 207 on the gear sector 201 and a stub shaft 208 mounted on the side wall 34 of the camera casing.

To limit travel of the drive shutter and diaphragm rings 90, 91 and 92, a rearwardly projecting pin 209 is fixed to the shutter and housing chamber 76 and is freely received in the aligned slots 154, 115 and 103 in the said three rings.

*The reflexing and masking mechanisms*

The top wall 33 of the camera casing is provided with an aperture 215 in which is inserted a ground glass viewing screen 216 of the usual type known to the art. The aperture 215 may be closed by a door 217 hingedly mounted as at 218 to the front edge of the aperture. A suitable handle 219 and spring catch 220 may also be provided.

Integrally formed with the front and side walls defining the aperture 215 is a reflex mirror housing 221 (Figs. 6, 8 and 18) which is substantially quarter-cylindrical in shape, the front portion 222 of said housing being of a slightly larger radius than the rear portion 223 thereof. The said front portion 222 is provided with an aperture 224 adjacent the lens assembly 70 which is in alignment with the photographic optical system. The rear of the mirror housing 221 is formed integrally with the transverse wall 48.

Journalled in the side walls 226 and 227 of the mirror housing 221 I provide a reflexing shaft 228. Mounted on said shaft 228 for rotation therewith is a capping or masking plate 229 which is attached to said shaft by means of a pair of arms 230 bent around the shaft and held thereto by rivets 231. The free ends 233 of said arms 230 are bent radially outward of the reflexing shaft 228 and may be supported in such position by means of specially tapered heads 232 provided on the rivets 231. The upper end of the capping plate 229 is provided with an arcuate extension 229a (Figs. 6 and 18), partially encircling the shaft 228 which, together with the arms 230, abuts a strip of plush 225 supported on a ledge 225a raised on the front face of the wall 48 in order to prevent light entering through the viewing screen from passing around the shaft 228 and fogging the film 42.

The reflexing mirror 234 is rotatably mounted on said shaft 228 by means of a backing plate 235 slightly longer than the capping plate 229. Said backing plate is provided with a pair of looped ears 236 which freely encircle the shaft 228. A helical spring 237 is loosely carried on said shaft between the ears 236 of the mirror backing plate 235 and is provided at its extremities with legs 238 and 239 which abut the neighboring surfaces of the capping plate 229 and backing plate 235. Said spring is maintained under torsional tension between said capping and backing plates.

A shoulder 240 is provided on the front wall of the mirror housing 221 to limit the upward travel of the capping plate and backing plate. Another shoulder 241 is formed at the juncture between the front and back portions 222 and 223 of the mirror housing. It will be seen, by reference to Fig. 18, that the backing plate 235 is adapted to rotate only in the front portion 222 of the mirror housing, being stopped at either end thereof by the shoulders 240 and 241. The capping plate 229 is free to sweep through the entire mirror housing between the upper shoulder 240 and the rear ledge 242. During such travel of the capping plate, the edges thereof lightly press upon all the walls of the mirror housing 221, except the front portion 222, to form a light seal therewith.

When the capping plate 229, mirror 234 and backing plate 235 are in position shown in Fig. 4, it is obvious that an operator may see on the viewing screen the scene which is transmitted through the objective lens of the camera.

As the shaft 228 is rotated from the position shown in Fig. 4, the mirror 234 and capping plate 229 will move together in constant angular relationship with respect to one another, the backing plate 235 being abutted against the radial arm ends 233 by action of the spring 237, until the edge of the backing plate 235 strikes the shoulder 240. At this time, the capping plate 229, mirror 234 and backing plate 235 will be in the position shown in Fig. 18. As the shaft 228 continues to rotate, the capping plate 229 will approach the backing plate 235 against the torsional action of the spring 237 until the capping plate 229 lies substantially flat against the said backing plate 235, as shown in full lines in Fig. 6, in which position the camera is ready to photograph a scene.

In order to rotate the mirror shaft 228 in properly timed relation with the other mechanisms heretofore described, I provide a crank arm 245 on an extension 246 of the shaft projecting through the mirror casing 221. Said crank arm is provided with a pin 247 which is connected through a link 248 to a pin 249 carried on the gear sector 201. The pins 247, 249 and link 248 should be kinematically proportioned so that the shaft 228 will rotate approximately 90° while the gear sector 201 and drive ring 90 travel through an arc of 60°, as indicated in Fig. 4.

*Correlated cycles of operation of the various mechanisms*

Assuming that a picture has been taken and the operator desires to photograph another scene, the knob 41 is rotated until the following exposure number on the film is visible through the aperture 53. At this time the camera is in uncocked position, the reflex mirror 234 being in its extreme upper position, as shown in Fig. 6, and the shutter being closed.

The camera is now loaded or cocked by rotating the cocking lever 203 in a clockwise direction (as viewed from Fig. 1). This action causes rotation of the shaft 202 and gear sector 201, stretching the spring 206 and storing energy therein for operation of the various parts when the operator later actuates the release button 166. The cocking motion of the gear sector 201 rotates the rack 200 and drive ring 90 in a counter-clockwise direction.

When the drive ring 90 begins its cocking cycle, the spring finger 186 is resting on the surface of the drive ring adjacent the lower end of the sloped groove 191. As the drive ring 90 rotates in a cocking direction, the spring finger 186 first enters the groove 191, being urged rearwardly until it rides on the rear surface of the cam 187 (Fig. 16) and then drops into engagement with the idling cam surface 190. During this motion of the drive ring and spring finger 186, the arcuate link 180 remains in the position shown in Fig. 13 with the crank arm 178 and shutter actuating shaft 175 in their unoperated positions. As the drive ring is rotated further in the same direction, the spring finger 186 encounters the cam surface 188 and is pushed inwardly (as shown in Fig. 10), sliding the arcuate link 180 downwardly and pivoting said link in a clockwise direction about the pivot 182. This movement of the link 180 causes the crank arm 178 and shutter actuating shaft 175 to rotate in a counter-clockwise direction until the shutter actuating shaft reaches operative position, as shown in Fig. 12, at the end of the cocking stroke.

At this time, the pawl 159 enters the ratch 158 on the drive ring 90 to latch the latter in cocked position until such time as the operator actuates the release button 166.

While the drive ring 90 is rotating as above described, the over-drive spring 155, against which the pins 102 and 116 of the diaphragm and shutter rings abut under the action of the helical springs 104 and 118, rotates the diaphragm and shutter rings 92 and 91 in a counter-clockwise direction to loaded position. This movement of the two setting rings causes the diaphragm and shutter lever arms 82 and 81 to move to their extreme position in a counter-clockwise sense, as shown in Fig. 5, at which time the diaphragm lever arm 82 will be in a position corresponding to maximum aperture and the shutter lever arm 81 will be in a position corresponding to "bulb" exposure.

It is thus apparent that when the shutter actuating shaft 175 reaches cocked position, as shown in Fig. 12, and operates the shutter, the shutter will remain open for viewing and the diaphragm will be set at its maximum aperture.

Further rotation of the diaphragm and shutter rings 92 and 91 is prevented by the stop pin 209 which contacts the ends of the slots 103 and 115. Said pin will also contact the end of the slot 154 on the drive ring 90 to prevent rotation of the latter for any considerable distance past cocking position. The slots 103, 115 and 154 are so disposed with respect to each other and the stop pin 209 that when the diaphragm and shutter rings 92 and 91 are stopped by the pin 209, the drive ring 90 will continue to rotate and the free leg of the over-drive spring 155 will bend back to allow the drive ring to travel until the stop pin 209 engages the end of the slot 154. After pressure is released from the cocking lever 203, the drive ring which has gone slightly beyond latched position will rotate in a clockwise direction until pawl 159 engages ratch 158.

It will be noted that by provision of the over-drive mechanism I rotate the diaphragm and shutter rings 92 and 91 to their fully loaded position, shown in Fig. 5, before the shutter actuating shaft 175 is brought to operative position, and thus ensure that the shutter is not tripped until the diaphragm is at maximum aperture and the shutter is set at "bulb."

As the gear sector 201 rotates in a clockwise direction during cocking, as viewed from Fig. 4, it will also similarly rotate the mirror shaft 228 through the link system comprising the pin 249 mounted on the gear sector 201, link 248, pin 247 and crank arm 245. During the first part of the rotation of the shaft 228 from the uncocked position shown in Fig. 6, the masking plate 229 will swing downwardly through the first portion 222 of the mirror chamber 221 until it passes the shoulder 241. The backing plate 235 and mirror 234 throughout this first motion remain in their upper position against the shoulder 240, due to the spreading action of the spring 237 exerted between the masking plate 229 and backing plate 235. As the shaft 228 continues to rotate, the radial arm portion 233 will engage the backing plate and both the masking plate and backing plate will move through the mirror chamber 221. During this latter phase of the mirror shaft's motion, the masking plate 229 will sweep through the portion 223 of the mirror chamber 221 while the backing plate 235 sweeps through the portion 222 thereof. At the end of the motion of the masking plate and backing plate, the masking plate will abut the rear ledge 242 of the mirror casing 221 and the backing plate 235 will abut the shoulder 241 of said casing.

It will thus be seen that when the various parts of the camera are in cocked position, the shutter will be open and the viewing optical system will comprise the objective lens, the reflexing mirror 234 and the ground glass viewing plate 216.

As the shutter does not open until the masking plate 229 abuts the rear ledge 242 of the mirror chamber, and the edges of the masking plate are in contact with the walls of the portion 223 of the mirror casing 221, no light can reach the film 42 either through the viewing screen 216 or the objective lens.

The operator may now view the scene he desires to photograph through an exposure meter to determine the desired shutter speed and diaphragm aperture opening. These readings are transferred to the camera by rotating the diaphragm and shutter setting knobs 130 and 130' until the numbers marked on sleeves 131 and 131' are in alignment with a fixed mark (not shown) on the front wall of the camera casing. The barrel cams 127 and 127' turn with the knobs 130 and 130' and cause the keys 134 and 134' to slide in the keyways 126 and 126', so that the positions of the stop fingers 136 and 136' correspond to the settings of the numerals 132, 132' on the sleeves 131 and 131'.

The camera is now in a loaded condition and the operator may view the scene desired to be photographed on the ground glass viewing screen 126 properly framing the same thereon, and at the same time varying the spacing of the front objective lens housing 72 from the film 42, as is well known in the art, to focus the scene to any desired degree of sharpness. Then, upon depressing the finger button 166, the scene viewed in the ground glass screen will be photographed upon the film 42 without any further manipulation on the part of the operator, the shutter and diaphragm rings 91 and 92 hereinabove described operating to set the pre-selected diaphragm aperture opening and shutter speed and the drive ring 90 serving to trip the shutter.

When the finger button 166 is depressed, the projection 167 carried on the release shaft 165 will engage the projection 168 on the lever 160, raising the detent 159 out of the ratch 158 and unlatching the drive ring 90. The drive spring 206 will then actuate the gear sector 201 and rack 200 to rotate the drive ring 90 in a clockwise direction. Immediately the drive ring 90 begins to rotate, the spring finger 186, which is riding on the cam surface 188, will move outwardly, allowing the shutter actuating shaft 175 to be turned in a clockwise direction by the spring in the shutter casing 70 to close the shutter.

While the drive ring 90 is rotating for the first 30° of its travel from fully cocked position, the mirror shaft 228 will turn approximately 45°, causing the backing plate 235 to sweep through the portion 222 of the mirror casing 221. As the backing plate passes the aperture 234 of the mirror casing, light from the viewing plate 216 will pass around the front edge of the backing plate. This light will be prevented from impinging on the film 42 by the masking plate 229, which during this movement has its edges lightly pressed against the walls of the portion 223 of the mirror casing. When the backing plate 235 abuts against the top shoulder 240, the viewing plate will be completely shut off from the mirror casing 221 by the said backing plate, as shown in Fig. 18.

As the drive ring 90 and mirror shaft 228 are rotated further, the backing plate will remain stationary and the masking plate 229 will approach it, torsionally compressing the spring 237 until the masking plate comes in close proximity to the backing plate 235, as shown in Figs. 6 and 9. In this position the masking plate has cleared the aperture 224 at the front of the mirror chamber 221 and prepared the photographic optical system for exposure of the film 42.

After the drive ring 90 rotates beyond the first 30° of its travel, the spring finger 186 will follow the idling cam surface 190 until it reaches the cam surface 189, where it is surged inwardly, rotating the link 180 in a clockwise direction and causing the crank arm 178 and shaft 175 to turn in a counter-clockwise direction until, when the spring finger 186 reaches the end of the said cam surface 189, the shaft 175 will reach operative position and trip the shutter for exposure.

When the drive ring 90 is released from cocked position, the over-drive spring 155 will move away from the pins 102 and 116 on the diaphragm and shutter rings 92 and 91, allowing these rings to be rotated in a clockwise direction by the springs 104 and 118 until a shoulder on their stepped cam surfaces 99 and 110 strikes against the stop fingers 136 and 136', setting the diaphragm and shutter at their pre-selected aperture opening and shutter speed.

In the event that the shuter ring 91 is stopped before the diaphragm ring 92, the pin 102 of the diaphragm ring will continue to travel through the slot 117 on the shutter ring following the drive spring 155 until a shoulder on the stepped cam surface 99 encounters the stop finger 136'.

The stepped cam surfaces 99 and 110 are so disposed relative to the end of the cam surface 189 that the diaphragm and shutter will be set at their pre-selected aperture opening and shutter speed before the spring finger 186 reaches the end of the cam surface 189 to trip the shutter and expose the film.

After exposure the drive ring 90 continues to rotate until the stop pin 209 abuts against the end of the slot 154 remote from the over-drive spring 156 and allows the spring finger 186 to be urged outwardly into alignment with the inclined groove 191 by the spring associated with the shutter through the train of mechanisms consisting of shaft 175, crank arm 178, pivot pin 179, rigid link 180 and resilient link 183. The various elements of the camera are then in position to repeat the above described cycles of operation.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

I claim:

1. In a reflex camera of the character described, in combination a casing having an aperture for receiving photographic sensitive material, one of the walls of said casing being of segmental circular shape, one half of said wall being of greater radius than the other half of said wall, the half of said wall which is of lesser radius being disposed adjacent said aperture, an aperture in the half of said wall of greater radius, said first and second apertures being in optical alignment with the optical axis of the camera, a capping plate oscillatable in said casing and forming a light seal with the portion of said casing including the wall half of smaller radius and a mirror oscillatable in that portion of casing including the wall half of larger radius.

2. A reflex camera as set forth in claim 1 wherein the capping plate and mirror are carried on the same shaft and are rotatable relative to each other and wherein the capping plate moves during movement of the mirror.

3. A reflex camera comprising an objective lens, a member disposed rearwardly of said lens and having an aperture adapted to receive photographically sensitive material, a shutter, a viewing screen, a reflex mirror intermediate said shutter and said apertured member, means to mount said mirror for reciprocal movement from a first position in which it will reflect light from said lens to said viewing screen to a second position in which it will allow light to pass uninterruptedly from said lens to said aperture and in which second position it will prevent light from entering said camera through said viewing screen, a capping plate associated with said mirror, means to mount said capping plate for reciprocal movement from a first position in which it blocks light from said aperture to a second position in which it clears said aperture, means to reciprocate said capping plate between its said positions, and means interconnecting the capping plate and reflex mirror for moving said mirror from its first named to its second named position upon movement of the capping plate from the latter's first named to its second named position and while the capping plate is still blocking said aperture and for moving the mirror from its second named to its first named position upon movement of the capping plate from the latter's second named to its first named position and while the capping plate is moving and is blocking said aperture.

4. A reflex camera comprising an objective lens, a member disposed rearwardly of said lens and having an aperture adapted to receive photographically sensitive material, a shutter, a viewing screen, a reflex mirror intermediate said shutter and said apertured member, means to rotatably mount said mirror for oscillation from a first position in which it will reflect light from said lens to said viewing screen to a second position in which it will allow light to pass uninterruptedly from said lens to said aperture and in which second position it will prevent light from entering said camera through said viewing screen, a capping plate associated with said mirror, means to rotatably mount said capping plate for oscillation from a first position in which it blocks light from said aperture to a second position in which it clears said aperture, means to oscillate said capping plate between its said positions, and means interconnecting the capping plate and reflex mirror for moving said mirror from its first named to its second named position upon movement of the capping plate from the latter's first named to its second named position and while the capping plate is still blocking said aperture and for moving the mirror from its second named to its first named position upon movement of the capping plate from the latter's second named to its first named position and while the capping plate is moving and is blocking said aperture.

5. A reflex camera as set forth in claim 4 wherein the means interconnecting the capping plate and reflex mirror is resilient so that the capping plate can be moved part of the way between its two positions without moving the mirror and part of the way between its two positions while moving the mirror.

6. A reflex camera as set forth in claim 4 wherein the capping plate is movable in a casing while the mirror moves between its two positions, said capping plate forming a light seal with the walls of said casing so that it will block light from said aperture while it is moving during movement of the mirror between said positions.

7. A reflex camera as set forth in claim 4 wherein the capping plate in its first position is substantially parallel to the apertured member and angularly spaced from the reflex mirror in the latter's first position, wherein the capping plate and mirror maintain such relative angular relationship during the movement of the mirror from its first to its second named position, and wherein the means interconnecting the capping plate and mirror is resilient so that the capping plate can complete its movement to its second named position after the mirror has reached its second named position.

8. A reflex camera as set forth in claim 4 wherein the capping plate in its first position is substantially parallel to the apertured member and angularly spaced 45° from the reflex mirror in the latter's first position, wherein the capping plate and mirror maintain such relative angular relationship during the movement of the mirror from its first to its second named position, and wherein the means interconnecting the capping plate and mirror is resilient so that the capping plate can complete its movement to its second named position after the mirror has reached its second named position.

9. A reflex camera as set forth in claim 4 wherein the capping plate in its first position is substantially parallel to the apertured member and angularly spaced 45° from the reflex mirror in the latter's first position, wherein the capping plate and mirror maintain such relative angular relationship during the movement of the mirror from its first to its second named position, wherein the means interconnecting the capping plate and mirror is resilient so that the capping plate can complete its movement to its second named position after the mirror has reached its second named position, and wherein the capping plate is movable in a casing with the walls of which the edges of the capping plate form a light seal while the mirror is moving between its two positions so that during movement of the mirror and the capping plate the capping plate blocks light from the aperture.

10. A reflex camera comprising a viewing optical system including a reflex mirror, a photographic optical system including an objective lens which also forms part of said viewing optical system, a mechanism to position said mirror so as to render said viewing optical system effective and said photographic optical system ineffective, a shutter having a shutter tripping means and a plurality of different instantaneous exposures and an exposure such that upon depression of said tripping means said shutter will open and remain open until further movement of said tripping means, shutter speed selecting means, means to preselect any one of said exposure periods by limiting movement of said selecting means, means operable upon actuation of the mirror positioning mechanism to open said shutter for viewing by setting said speed selecting means at said described speed and depressing said tripping means, means to close said shutter after viewing and before exposure by raising said tripping means, and means to reopen said shutter at a preselected exposure speed by actuating the shutter speed selecting means and then again depressing said tripping means.

11. A reflex camera comprising a viewing optical system including a reflex mirror, a photographic optical system including an objective lens which also forms part of said viewing optical stystem, a mechanism to position said mirror so as to render said viewing optical system effective and said photographic optical system ineffective, a shutter having a shutter tripping means and a plurality of different instantaneous exposures and an exposure such that upon depression of said tripping means said shutter will open and remain open until further movement of said tripping means, shutter speed selecting means, means to preselect any one of said exposure periods by limiting movement of said selecting means, means operable upon actuation of the mirror positioning mechanism to open said shutter for viewing by setting said speed selecting means at said described speed and depressing said tripping means, means to close said shutter after viewing and before exposure by raising said tripping means, and means to reopen said shutter at a preselected exposure speed by actuating the shutter speed selecting means and then again depressing said tripping means, said last named means including a control member which the speed selecting means follows until said speed selecting means is halted by the preselecting means, said member functioning to depress the tripping means for exposure after said member has passed a position corresponding to the extreme movement of said speed selecting means.

12. A reflex camera comprising a viewing optical system including a reflex mirror, a photographic optical system including an objective lens which also forms part of said viewing optical system, a mechanism to position said mirror so as to render said viewing optical system effective and said photographic optical system ineffective, a shutter having a shutter tripping means and a plurality of different instantaneous exposures and an exposure such that upon depression of said tripping means said shutter will open and remain open until further movement of said tripping means, shutter speed selecting means, means to preselect anyone of said exposure periods by limiting movement of said selecting means, means operable upon actuation of the mirror positioning mechanism to open said shutter for viewing by setting said speed selecting means at said described speed and depressing said tripping means, a release member, and means operable upon a single downstroke of said release member to automatically close said shutter after viewing and before actuation by raising said tripping means and to reopen said shutter at a preselected exposure speed by actuating the shutter speed selecting means and then again depressing said tripping means.

13. A reflex camera comprising a viewing optical system including a reflex mirror, a photographic optical system including an objective lens which also forms part of said viewing optical system, a shutter associated with said lens, said shutter being adjustable for several exposure periods including a plurality of different instantaneous exposures and one at which the shutter opens and remains open when a shutter tripping means is depressed, means to vary the exposure of said shutter, said last named means being reciprocable between two extreme positions, means to preselect any one of said exposure periods by limiting movement of said selecting means, a driving mechanism to move said exposure varying means between said two positions, means to load said driving mechanism, means operative upon actuation of said loading means to set said shutter at said described speed and depress said tripping means, means also operative upon the actuation of said loading means to position said reflex mirror in such manner as to render said viewing optical system effective, a release member, means operable upon a downstroke of said release member to first close said shutter by raising said tripping means, to then release said driving mechanism which moves said exposure varying means to set said shutter at a preselected exposure period and to finally reopen said shutter for exposure at said preselected speed by again depressing said tripping means.

14. A reflex camera comprising a viewing optical system including a reflex mirror, a photographic optical system including an objective lens which also forms part of said viewing optical system, a member having an aperture adapted to receive photographically sensitive material, a shutter having several exposure periods including one at which the shutter will open and remain open when a shutter tripping means is depressed, reciprocable shutter speed selecting means, a reciprocable member to move said speed selecting means and thereby vary the exposure period of said shutter, said member being movable between two extreme positions, a driving mechanism to move said member between said two positions, means to preselect anyone of said exposure periods by limiting movement of said member, means to load said driving mechanism, means operative upon actuation of said loading means to set said shutter at said described speed, a diaphragm of variable aperture, reciprocable diaphragm aperture varying means, a reciprocable member to move said diaphragm aperture varying means and thereby adjust the opening of said diaphragm, said last named member being movable between two extreme positions, a driving mechanism to move said last named member between said two positions, means to preselect anyone of said diaphragm apertures by limiting movement of said last named member, means to load said last named driving mechanism, means operative upon actuation of said last named loading means to open said diaphragm to its maximum aperture, a third reciprocable member movable between two extreme positions, a driving mechanism to move said third member between said two positions, means to load said third driving mechanism simultaneously with the loading of the first two driving mechanisms, means operative upon actuation of said third loading means to position said mirror between said aperture and lens so as to render said viewing optical system effective and to depress said tripping means, a release member, means operable upon actuation of said release member to render all of said driving mechanisms effective whereby to reduce said diaphragm aperture opening to a preselected opening and set said shutter at a preselected exposure period, said third member positioning said mirror so as to render said photographic optical system effective upon actuation of said third driving mechanism, said third member having means to raise said shutter tripping means and close said shutter before said mirror is moved to render said photographic optical system effective, and said third member also having means to trip said shutter at said preselected exposure speed after said mirror has been set in its last named position, said diaphragm has been set at its preselected opening and said shutter has been set at its preselected speed.

15. A reflex camera comprising a viewing optical system including a reflex mirror, a photographic optical system including an objective lens which also forms part of said viewing optical system, a member having an aperture adapted to receive photographically sensitive material, a shutter having several exposure periods including one at which the shutter will open and remain open when a shutter tripping means is depressed, oscillatible shutter speed selecting means, a rotary member to move said speed selecting means and thereby vary the exposure period of said shutter, said member being rotatable between two extreme positions, a driving mechanism to move said member between said two positions, means to preselect any one of said exposure periods by limiting movement of said rotating member, means to load said driving mechanism, means operative upon actuation of said loading means to set said shutter at said described speed, a diaphragm of variable aperture, oscillatible diaphragm aperture varying means, a rotary member to move said diaphragm aperture varying means and thereby adjust the opening of said diaphragm, said last named member being rotatable between two extreme positions, a driving mechanism to move said last named member between said two positions, means to preselect any one of said apertures by limiting movement of said last named member, means to load said last named driving mechanism, means operative upon actuation of said last named loading means to open said diaphragm to its maximum aperture, said rotary members being coaxial, a third rotary member coaxial with said first two rotary members and rotatable between two extreme positions, a driving mechanism to move said third rotary member between said two positions, means to load said third driving mechanism simultaneously with the loading of the first two driving mechanisms, means operative upon actuation of said third loading means to position said mirror between said aperture and lens so as to render said viewing optical system effective and to depress said tripping means, a release member, means operable upon actuation of said release member to render all of said driving mechanisms effective whereby to reduce said diaphragm aperture opening to a preselected opening and set said shutter at a preselected exposure period, said third rotary member positioning said mirror so as to render said photographic optical system effective upon actuation of said third driving mechanism, said third rotary member having means to raise said shutter tripping means and close said shutter before said mirror is moved to render said photographic optical system effective, and said third rotary member also having means to trip said shutter at said preselected exposure speed after said mirror has been set in its last named position, said diaphragm has been set at its preselected opening and said shutter has been set at its preselected speed.

16. A camera as set forth in claim 15 wherein said third rotary member includes control means which said first two rotary members follow until halted by the speed and aperture preselecting means, said third member tripping said shutter after it has passed a position corresponding to the extreme movements of said first two rotary members.

17. A reflex camera comprising a viewing optical system including a reflex mirror, a photographic optical system including an objective lens which also forms part of said viewing optical system, a mechanism to position said mirror so as to render said viewing optical system effective and said photographic optical system ineffective, a shutter, a diaphragm having an adjustable aperture, means to adjust said aperture, means to move said adjusting means, means operable upon actuation of said mechanism to move said moving means in a direction and to a degree to open said aperture to its maximum extent, a diaphragm aperture preselecting means which limits movement of said moving means, a release member, and means operable upon actuation of said release member to position said mirror so as to render said viewing optical system ineffective and said photographic optical system completely effective, to actuate said moving means so as to close said aperture to a preselected degree and only then to trip said shutter.

18. A reflex camera comprising a viewing optical system including a reflex mirror, a photographic optical system including an objective lens which also forms part of said viewing optical system, a mechanism to position said mirror so as to render said viewing optical system effective and said photographic optical system ineffective, a shutter, a diaphragm having an adjustable aperture, means to adjust said aperture, means to move said adjusting means, means operable upon actuation of said mechanism to move said moving means in a direction and to a degree to open said aperture to its maximum extent, a diaphragm aperture preselecting means which limits movement of said moving means, a release member, and means operable upon actuation of said release member to position said mirror so as to render said viewing optical system ineffective and said photographic optical system completely effective, to actuate said moving means so as to close said aperture to a preselected degree and to trip said shutter, the means for moving the adjusting means following the means for tripping the shutter upon actuation of the release member to thereby control the operation of said preselecting means so that the diaphragm is set at its preselected aperture opening before the shutter is tripped.

19. A reflex camera comprising a viewing optical system including a reflex mirror, a photographic optical system including an objective lens which also forms part of said viewing optical system, a mechanism to position said mirror so as to render said viewing optical system effective and said photographic optical system ineffective, a shutter, a diaphragm having an adjustable aperture, means to adjust said aperture, means to move said adjusting means, means operable upon actuation of said mechanism to move said moving means in a direction and to a degree to open said aperture to its maximum extent, a diaphragm aperture preselecting means which limits movement of said moving means, a release member, means operable upon actuation of said release member to position said mirror so as to render said viewing optical system ineffective and said photographic optical system completely effective, means also operable upon actuation of said release member to render said moving means effective, and means likewise operable upon actuation of said release member to trip said shutter, said last named means being followed by the moving means upon actuation of the release member to thereby control the operation of said diaphragm aperture preselecting means so that said diaphragm is set at a preselected aperture opening before the shutter is tripped.

20. A reflex camera comprising a viewing optical system including a reflex mirror, a photographic optical system including an objective lens which also forms part of said viewing optical system, a mechanism to position said mirror so as to render said viewing optical system effective and said photographic optical system ineffective, a shutter, a diaphragm having an adjustable aperture, means to adjust said aperture, means to move said adjusting means, means operable upon actuation of said mechanism to move said moving means in a direction and to a degree to open said aperture to its maximum extent, a diaphragm aperture preselecting means which limits movement of said moving means, a release member, means operable upon actuation of said release member to trip said shutter, means interconnecting said last named means and said mirror to position said mirror upon actuation of said release member so as to render said viewing optical system ineffective and said photographic optical system completely effective, and means also operable upon actuation of said release member to render said moving means effective, said means for tripping said shutter upon actuation of said release member being followed by the moving means to thereby control the operation of the preselecting means so that the diaphragm aperture opening is preselected before the shutter is tripped.

21. A reflex camera comprising a viewing optical system including a reflex mirror, a photographic optical system including an objective lens which also forms part of said viewing optical system, a mechanism to position said mirror so as to render said viewing optical system effective and said photographic optical system ineffective, a shutter, a diaphragm having an adjustable aperture, means to adjust said aperture, means to move said adjusting means, means operable upon actuation of said mechanism to move said moving means in a direction and to a degree to open said aperture to its maximum extent, a diaphragm aperture preselecting means which limits movement of said moving means, a release member, a rotary member, a driving mechanism for said rotary member which is loaded upon movement of the mechanism which positions the mirror to render the viewing optical system effective, means to latch said rotary member with the driving mechanism loaded, said rotary member being unlatched upon actuation of said release member to actuate said moving means so as to reduce said aperture to a preselected opening, said moving means following said rotary member upon actuation of said release member to thereby control the operation of the preselecting means, means on said rotating member to position said mirror upon actuation of said release member so as to render said viewing optical system ineffective and said photographical optical system completely effective, and means on said rotary member to trip said shutter after the movement of said moving means is halted by said preselecting means and said photographical system is rendered completely effective.

JOSEPH PIGNONE